United States Patent
Vahteri et al.

(10) Patent No.: US 9,234,061 B2
(45) Date of Patent: Jan. 12, 2016

(54) MULTIMODAL POLYMER

(71) Applicant: BOREALIS AG, Vienna (AT)

(72) Inventors: Markku Vahteri, Porvoo (FI); Antti Tynys, Linz (AT); Erik Eriksson, Stenungsund (SE); Magnus Palmlöf, Västra Frölunda (SE); Tuomas Noopila, Helsinki (FI); Ilke Senol, Espoo (FI); Saeid Kheirandish, Wehrheim (DE)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 14/388,427

(22) PCT Filed: Mar. 28, 2013

(86) PCT No.: PCT/EP2013/056788
§ 371 (c)(1),
(2) Date: Sep. 26, 2014

(87) PCT Pub. No.: WO2013/144324
PCT Pub. Date: Oct. 3, 2013

(65) Prior Publication Data
US 2015/0051364 A1    Feb. 19, 2015

(30) Foreign Application Priority Data
Mar. 28, 2012 (EP) ................................. 12161866

(51) Int. Cl.
*C08F 210/16* (2006.01)
*C08J 5/18* (2006.01)
(Continued)

(52) U.S. Cl.
CPC ............... *C08F 210/16* (2013.01); *C08J 5/18* (2013.01); *C08L 23/04* (2013.01); *C08J 2323/08* (2013.01);
(Continued)

(58) Field of Classification Search
CPC ......... C08L 23/04; C08L 23/06; C08L 23/08; C08L 23/0815; C08L 23/16; C08L 2314/02; C08L 2205/03; C08L 2203/16
See application file for complete search history.

(56) References Cited

U.S. PATENT DOCUMENTS 6,355,733 B1   3/2002   Williams et al.
8,268,425 B2 *  9/2012   Vogt et al. ............. C08F 210/16
                                                      428/35.7
(Continued)

FOREIGN PATENT DOCUMENTS

EP    0517868 A1    12/1992
EP    0773258 A2    5/1997
(Continued)

OTHER PUBLICATIONS

International Search Report and Written Opinion dated Jun. 18, 2013 (PCT/EP2013/056788); ISA/EP.

*Primary Examiner* — Rip A Lee
(74) *Attorney, Agent, or Firm* — Banner & Witcoff, Ltd.

(57) ABSTRACT

A multimodal ethylene copolymer with a density of at least 940 kg/m³ having an $MFR_{21}$ in the range of 1 to 30 g/10 min and a $F_{max}/\lambda_f$ ratio of less than 60 cN/s; said ethylene copolymer comprising at least three components (I) an ethylene and optionally at least one C3-20 alpha olefin comonomer component forming 30 to 60 wt % of said ethylene copolymer; (II) an ethylene and optionally at least one C3-20 alpha olefin comonomer second component forming 30 to 60 wt % of said ethylene copolymer: and (III) an ethylene and optionally at least one C3-20 alpha olefin comonomer third component forming 3 to 20 wt % of said ethylene copolymer; wherein at least one of components (II) or (III) is a copolymer.

19 Claims, 2 Drawing Sheets

$F_{max}/\lambda_1$ ratio of different examples (51) Int. Cl.
*C08L 23/04* (2006.01)
*C08L 23/08* (2006.01)

(52) U.S. Cl.
CPC ............ *C08L 23/08* (2013.01); *C08L 2203/16* (2013.01); *C08L 2205/03* (2013.01); *C08L 2314/02* (2013.01)

(56) References Cited

U.S. PATENT DOCUMENTS

| | | |
|---|---|---|
| 2005/0137337 A1 | 6/2005 | Kwalk |
| 2006/0178482 A1 | 8/2006 | Kwalk |
| 2008/0275197 A1 | 11/2008 | Coffy et al. |
| 2010/0092709 A1 | 4/2010 | Joseph |

FOREIGN PATENT DOCUMENTS

| | | | | |
|---|---|---|---|---|
| EP | 0810235 | A2 | 12/1997 | |
| EP | 1 655 334 | A1 * | 5/2006 | ............ C08L 23/04 |
| EP | 1655334 | A1 | 5/2006 | |
| EP | 1712574 | A1 | 10/2006 | |
| EP | 2011822 | A1 | 1/2009 | |
| WO | 95/35323 | A1 | 12/1995 | |
| WO | 96/18677 | A1 | 6/1996 | |
| WO | 99/51646 | A1 | 10/1999 | |
| WO | 00/22040 | A1 | 4/2000 | |
| WO | 01/55230 | A1 | 8/2001 | |
| WO | 02/18461 | A2 | 3/2002 | |
| WO | 03106510 | A1 | 12/2003 | |
| WO | WO 2006/053741 | A1 * | 5/2006 | ............ C08L 23/06 |
| WO | 2006/092377 | A1 | 9/2006 | |
| WO | 2006/092378 | A1 | 9/2006 | |
| WO | 2006/092379 | A1 | 9/2006 | |
| WO | WO 2007/003530 | A1 * | 1/2007 | ............ C08L 23/08 |
| WO | WO 2007/022908 | A2 * | 3/2007 | |
| WO | 2007/045415 | A1 | 4/2007 | |
| WO | 2008/077530 | A2 | 7/2008 | |
| WO | WO 2008/077530 | A2 * | 7/2008 | ............ C08L 23/04 |
| WO | WO 2009/003712 | A1 * | 1/2009 | ............ C08L 23/04 |
| WO | WO 2013/144328 | A1 * | 10/2013 | ............ C08L 23/04 |

\* cited by examiner

Figure 1. $F_{max}/\lambda_I$ ratio of different examples

Figure 2. Complex viscosity vs complex modulus of examples and commercial reference FS1560.

Figure 3. Film extrusion – melt pressure vs melt temperature.

Figure 4. Maximum take-off speed.

MULTIMODAL POLYMER

The present application is the U.S. National Phase of International Application No. PCT/EP2013/056788, filed on Mar. 28, 2013, designating the United States of America and claiming priority to European Patent Application No. 12161866.4, filed Mar. 28, 2012, and this U.S. national phase application claims priority to and the benefit of the above-identified applications, each of which is incorporated by reference herein in its entirety.

This disclosure concerns a multimodal polyethylene polymer which is suitable for use in film and fibre applications, as well as a process for the manufacture thereof. In particular, the disclosure, relates to a multistage process for the manufacture of a multimodal high density polyethylene, preferably trimodal high density polyethylene, having an amount of an ultra high molecular weight component to maximise rheological properties without appreciably increasing the molecular weight of the polymer.

The use of polyethylenes for film and fibre manufacture is well known. There are countless disclosures of all manner of polyethylenes for the manufacture of these valuable products.

It is desirable to increase output in film and fibre production, especially in high density polyethylene (HDPE) blown film processing and fibre product development. Increased output is economically beneficial as more product can be produced per unit time but any increases in output must be achieved without detriment the properties of the polymer.

By increasing melt flow rate (MFR) of a polymer resin, melt temperature and melt pressure during film blowing can be decreased. This is expected to increase the output of a blown film process. On the other hand, an increased MFR typically has a negative effect on bubble stability, and therefore in order have good bubble stability during blown film processes, film resins with low MFR are preferred. There is therefore a trade off between higher MFR and increased output and poor processability through poor bubble stability.

The present inventors therefore researched new polymer resins which enable higher throughput, especially in blown film processes, while maintaining bubble robustness and stability. It goes without saying that any manipulation of the polymer properties to enable improved throughput should not be detrimental to the final film properties, e.g. in terms of mechanical strength, optical properties and the like.

The inventors have found that by adding an amount of an ultra high molecular weight fraction into a bimodal polyethylene composition, the Mw/Mn (measured by GPC) is not significantly broadened. However, the inventors have surprisingly found that the effect of this addition can be seen readily in rheological behaviour, especially in terms of shear thinning index, the first moment of the relaxation spectrum $\lambda_I$ and the ratio of $F_{max}/\lambda_I$.

The present inventors therefore sought to maximise the processability of a bimodal HDPE resin by adding an amount of an ultra high Mw fraction. At a similar MFR value as the corresponding bimodal polymer therefore, the polymer of the disclosure incorporating the additional ultra high molecular weight component, has improved processability. This can be seen, inter alia, in terms of higher take off speeds. Most significantly, this can be seen in terms of lower $F_{max}/\lambda_I$ ratio (maximum force from rheotens measurement/first moment of the relaxation spectrum) compared with a bimodal counterpart.

The inventors have surprisingly found that compared with a bimodal resin with comparable MFR value, the three component polymers of certain examples show improved processability. This allows therefore reductions in melt pressure and temperature during film blowing to be achieved and hence an increase in output whilst maintaining stable process conditions (i.e. a stable/robust bubble).

The prior art in this field does not appreciate the advantages of the disclosure. In particular, in the prior art, it is not reported that a higher maximum take off speed and lower $F_{max}/\lambda_I$ ratio in blown film processes can be achieved with the polymer design of certain examples.

Trimodal polymers are known. EP-A-1655334 describes a trimodal polymer with ultrahigh Mw fraction for use in the manufacture of pipes and cables. In this reference, the ultra high Mw component is a homopolymer of ethylene produced in prepolymerisation. A similar disclosure can be found in EP-A-1712574 where a small prepolymerisation polymer may be present alongside a bimodal polyethylene. The present disclosure teaches the formation of the ultra high molecular weight component in the last step of the manufacturing process and not as a prepolymer. The purpose of the prepolymerisation step is to prepare the catalyst for successful use in the main polymerisation stage. Any prepolymer formed is often of poor quality. Also, the prepolymer does not have the necessary ultra high Mw and the amount is not high enough to enable the effects of the present disclosure.

WO2006/092377, WO2006/092378 and WO2006/092379 are related cases describing a fully trimodal composition for film manufacture. All three components of the multimodal polymer form a minimum of 10 wt % of the polymer composition meaning therefore that each component unambiguously affects the overall Mw and MFR of the blend.

There are disclosures of three component blends where a bimodal polymer is mixed with a third component. In many of these cases there is no minor component and where blending occurs there is always the risk of inhomogeneity leading to gels or white spots. US2005/0137337 and US 2006/0178842 describe blends of bimodal and unimodal polymer but these are not formed in a single process.

WO2008/077530 suggests the formation of a tricomponent polymer using a trifunctional catalyst. It is however very difficult to achieve a valuable polymer product using such a catalyst as it is impossible to run all the components of the catalyst at optimal conditions.

EP-A-2011822 describes a very complex polymer composition comprising numerous components formed in multiple polymerisation stages. These polymers do not appear to be high density.

There remains therefore the need for a multimodal high density ethylene copolymer composition that can provide advantageous processing properties without loss of mechanical properties to therefore enable higher output in polymer processing.

Surprisingly the inventors have found that in the case of trimodal polymer design, which had a significantly lower $F_{max}/\lambda_I$ ratio (maximum force from rheotens measurement/ first moment of the relaxation spectrum) compared with a bimodal counterpart, a marked increase in take-off speed is achieved in a film blowing process. The inventors have demonstrated therefore that a low $F_{max}/\lambda_I$ ratio is needed, when improved processability in film blowing is targeted.

SUMMARY

Thus viewed from a first aspect the disclosure provides a process for the preparation of a multimodal ethylene copolymer comprising:

(I) polymerising ethylene and optionally at least one C3-20 alpha olefin comonomer in a first stage in the presence of a catalyst so as to form a first component forming 30 to 60 wt % of said ethylene copolymer;

(II) polymerising ethylene and optionally at least one C3-20 alpha olefin comonomer in a second stage in the presence of the same catalyst so as to form a second component forming 30 to 60 wt % of said ethylene copolymer; and (III) polymerising ethylene and optionally at least one C3-20 alpha olefin comonomer in a third stage in the presence of the same catalyst so as to form a third component forming 3 to 20 wt % of said ethylene copolymer;

wherein at least one of components (II) or (III) is a copolymer; and wherein said multimodal ethylene copolymer has a density of at least 940 kg/m$^3$, an MFR$_{21}$ in the range of 1 to 30 g/10 min and a F$_{max}$/λ$_I$ ratio of less than 60 cN/s.

Some examples provide a multimodal ethylene copolymer obtained by a process as hereinbefore defined.

Some examples provide a multimodal ethylene copolymer with a density of at least 940 kg/m$^3$ and having an MFR$_{21}$ in the range of 1 to 30 g/10 min and a F$_{max}$/λ$_I$ ratio of less than 60 cN/s;

said ethylene copolymer comprising at least three components:

(I) an ethylene and optionally at least one C3-20 alpha olefin comonomer component forming 30 to 60 wt % of said ethylene copolymer;

(II) an ethylene and optionally at least one C3-20 alpha olefin comonomer second component forming 30 to 60 wt % of said ethylene copolymer; and (III) an ethylene and optionally at least one C3-20 alpha olefin comonomer third component forming 3 to 20 wt % of said ethylene copolymer;

wherein at least one of components (II) or (III) is a copolymer.

Some examples provide the use of a multimodal ethylene copolymer as hereinbefore described or formed by a process as hereinbefore defined in the manufacture of a films or fibres, especially blown film.

Other examples provide a multimodal ethylene copolymer with a density of at least 940 kg/m$^3$ having an MFR$_{21}$ in the range of 1 to 30 g/10 min and a F$_{max}$/λ$_I$ ratio of less than 60 cN/s;

said ethylene copolymer comprising at least three components (I) an ethylene and optionally at least one C3-20 alpha olefin comonomer component forming 30 to 60 wt % of said ethylene copolymer;

(II) an ethylene and optionally at least one C3-20 alpha olefin comonomer second component forming 30 to 60 wt % of said ethylene copolymer; and (III) an ethylene and at least one C3-20 alpha olefin comonomer third component forming 3 to 20 wt % of said ethylene copolymer;

wherein the Mw of component (I) is lower than that of component (II) and the Mw of component (II) is lower than that of component (III).

Another example provides a multimodal ethylene copolymer with a density of at least 940 kg/m$^3$ having an MFR$_{21}$ in the range of 1 to 30 g/10 min and a F$_{max}$/λ$_I$ ratio of less than 60 cN/s;

said ethylene copolymer comprising at least three components (I) an ethylene homopolymer component forming 30 to 60 wt % of said ethylene copolymer;

(II) an ethylene and at least one C3-20 alpha olefin comonomer second component forming 30 to 60 wt % of said ethylene copolymer; and (III) an ethylene and at least one C3-20 alpha olefin comonomer third component forming 3 to 20 wt % of said ethylene copolymer;

wherein the Mw of component (I) is lower than that of component (II) and the Mw of component (II) is lower than that of component (III).

Another example provides a multimodal ethylene copolymer with a density of at least 940 kg/m$^3$ having an MFR$_{21}$ in the range of 1 to 30 g/10 min and a F$_{max}$/λ$_I$ ratio of less than 60 cN/s;

said ethylene copolymer comprising at least three components (I) an ethylene and optionally at least one C3-20 alpha olefin comonomer component forming 30 to 60 wt % of said ethylene copolymer;

(II) an ethylene and optionally at least one C3-20 alpha olefin comonomer second component forming 30 to 60 wt % of said ethylene copolymer; and (III) an ethylene and at least one C3-20 alpha olefin comonomer third component forming 3 to 20 wt % of said ethylene copolymer;

wherein the MFR$_2$ of component (I) is higher than that of component (II) and the MFR$_2$ of component (II) is higher than that of component (III). Alternatively viewed, the MFR$_5$ of component (I) is higher than that of component (II) and the MFR$_5$ of component (II) is higher than that of component (III). Alternatively viewed, the MFR$_{21}$ of component (I) is higher than that of component (II) and the MFR$_{21}$ of component (II) is higher than that of component (III).

Other examples provide a multimodal ethylene copolymer with a density of at least 940 kg/m$^3$ having an MFR$_{21}$ in the range of 1 to 30 g/10 min and a F$_{max}$/λ$_I$ ratio of less than 60 cN/s;

said ethylene copolymer comprising at least three components (I) a lower Mw ethylene and optionally at least one C3-20 alpha olefin comonomer component forming 30 to 60 wt % of said ethylene copolymer;

(II) a higher Mw ethylene and optionally at least one C3-20 alpha olefin comonomer second component forming 30 to 60 wt % of said ethylene copolymer; and (III) an ultra high Mw ethylene and optionally at least one C3-20 alpha olefin comonomer third component forming 3 to 20 wt % of said ethylene copolymer;

wherein at least one of components (II) or (III) is a copolymer.

DETAILED DESCRIPTION

The present disclosure relates to a process for the manufacture of a multimodal ethylene copolymer composition involving at least 3 stages, preferably arranged in series, as well as the polymers made by that process. As the polymers of certain examples are preferably made in this multistep process, as opposed to by mechanical blending, it is anticipated that the homogeneity of the produced materials is improved. The polymers of certain examples are made therefore in a multistage process. They should not be mechanical blends.

It will be appreciated that components (I) to (III) cannot be the same. If all components were the same then the polymer would not be multimodal as required by the disclosure. Moreover, it would not possess the F$_{max}$/λ$_I$ ratio of less than 60 cN/s as required by certain examples.

As noted below, it is preferred if in components of one example, the Mw of component (I) is lower than that of component (II) and the Mw of component (II) is lower than that of component (III). Alternatively viewed therefore, as MFR and Mw are linked, the $MFR_2$, $MFR_5$ and/or $MFR_{21}$ of component (I) is higher than that of component (II) and the $MFR_2$, $MFR_5$ and/or $MFR_{21}$ of component (II) is higher than that of component (III) respectively. This can be observed as the MFR of the polymer of the example reduces as each additional component (II) then (III) is added.

Mw refers to weight average molecular weight. The Mw of the ultra high Mw component is higher than that of the second component.

Multimodal Ethylene Copolymer

The process of the disclosure enables the formation of a multimodal ethylene copolymer. By ethylene polymer is meant a polymer in which ethylene is the major repeating unit. At least 50 wt %, such as at least 70 wt %, more preferably at least 90 wt % of the monomer units in the polymer derives from ethylene.

As noted above, the polymer of certain examples is preferably prepared in a three step process and ideally comprises at least three components. It will be appreciated however that as the third component forms a minor percentage of the overall polymer, directly detecting the presence of that fraction, e.g. via GPC curves may be difficult. The present inventors suggest that its presence can however be shown via the processability of the multimodal ethylene copolymers of certain examples.

The third component, made in the third step of the process of certain examples, is preferably a copolymer. More preferably, this component is an ultra high molecular weight component, possessing a Mw (weight average molecular weight) much higher than the Mw values of the other two components. It may therefore have a Mw of 1,000 kg/mol or more.

Preferably, two components of the multimodal ethylene copolymer of various examples are copolymers. In some embodiments all three components can be copolymers. Ideally one component, preferably the first component, is a polyethylene homopolymer. By ethylene homopolymer is meant a polymer which is formed essentially only from ethylene monomer units, i.e. is 99.9 wt % ethylene or more. It will be appreciated that minor traces of other monomers may be present due to industrial ethylene containing trace amounts of other monomers.

The multimodal ethylene copolymer of some examples therefore comprises at least one comonomer, e.g. $C_{3-20}$ alpha-olefin. Preferred comonomers are alpha-olefins with 3-8 carbon atoms.

Preferably, the comonomer is selected from the group consisting of propene, 1-butene, 1-hexene, 4-methyl-1-pentene and 1-octene. It is possible for each component of the polymer to comprise the same or different comonomers. Preferably the same comonomer is used in all copolymeric components.

The polymers of certain examples can comprise one comonomer or two comonomers or more than 2 comonomers. The use of a single comonomer is however preferred. It is possible for some components of the polymer to be binary copolymers whilst others are terpolymers. Highly preferred comonomers are 1-butene, 1-hexene and 1-octene or mixtures thereof. The use of 1-butene is especially preferred.

In a most preferred embodiment, the ethylene copolymer of the example comprises one homopolymer component and two copolymer components. The comonomer employed is preferably 1-butene only.

Another example provides a process for the preparation of a multimodal ethylene copolymer comprising:

(I) polymerising ethylene in a first stage in the presence of a catalyst so as to form a first component forming 30 to 60 wt % of said ethylene copolymer;

(II) polymerising ethylene and at least one C3-8 alpha olefin comonomer in a second stage in the presence of the same catalyst so as to form a second component forming 30 to 60 wt % of said ethylene copolymer; and (III) polymerising ethylene and at least one C3-8 alpha olefin comonomer in a third stage in the presence of the same catalyst so as to form a third component forming 3 to 20 wt % of said ethylene copolymer;

wherein said multimodal ethylene copolymer has a density of at least 940 kg/m$^3$, an $MFR_{21}$ in the range of 1 to 30 g/10 min and a $F_{max}/\lambda_I$ ratio of less than 60 cN/s.

Component (I) of the polymer preferably forms the largest component present. Preferably there is 40 to 60 wt % of component (I), especially 45 to 55 wt % of component (I).

Component (II) of the polymer preferably forms the second largest component present. Preferably there is 30 to 55 wt % of component (II), especially 35 to 45 wt % of component (II).

Component (III) of the polymer preferably forms the smallest component present. Preferably there is 5 to 18 wt % of component (III), especially 5 to 16 wt % of component (III). In some embodiments there is less than 10 wt % of the component (III) e.g. 4 to 9 wt %.

The amount of comonomer in the polymer of various examples is preferably 0.05-1 wt %, more preferably 0.1-0.6 wt %.

The ethylene copolymer of the present examples has a density of at least 940 kg/m$^3$, preferably at least 945 kg/m$^3$, more preferably at least 950 kg/m$^3$, even more preferably at least 954 kg/m$^3$. Ideally the polymer will have a density of no more than 980 kg/m$^3$, e.g. no more than 970 kg/m$^3$, such as no more than 965 kg/m$^3$. A highly preferred range is 954 to 965 kg/m$^3$.

The ethylene copolymer of some examples preferably has an $MFR_5$ of 0.01 to 10 g/10 min, such as 0.05 to 5 g/10 min, especially 0.1 to 2 g/10 min. In a highly preferred embodiment the $MFR_5$ is at least 0.6 g/10 min, especially 0.6 to 2 g/10 min. The $MFR_{21}$ of the copolymer of these examples is preferably 1 to 30 g/10 min, more preferably 3-20 g/10 min, even more preferably 10 to 18 g/10 min.

$MFR_2$ values may range from 0.001 to 5 g/10 min. Ideally the $MFR_2$ value is less than 1 g/10 min.

The MFR is an indication of the flowability, and hence the processability, of the polymer. The higher the melt flow rate, the lower the viscosity of the polymer and hence easier its processability. The $MFR_2$, $MFR_5$ or $MFR_{21}$ of the copolymer of some examples is preferably less than the $MFR_2$, $MFR_5$ or $MFR_{21}$ of components (I) and (II) combined respectively.

$FRR_{21/5}$ values (i.e. the ratio of $MFR_{21}/MFR_5$) may be in the range of 20 to 50, preferably 20 to 45, such as 23 to 40.

The ethylene copolymers of some examples preferably have a weight average molecular weight, $M_w$ of at least 80 kg/mol, preferably at least 100 kg/mol. Mw values are preferably less than 300 kg/mol, such as less than 250 kg/mol.

Number average molecular weight, $M_n$, values are preferably low, for example between 5 and 20 kg/mol, such as 5 to 12 kg/mol.

Mw/Mn values are also preferably narrow for a trimodal material, e.g. 30 or less, such as 26 or less. The minimum value may be 10. These values are measured by GPC.

The rheological behaviour of the polymers of certain examples is particularly interesting. The presence of the third, preferably ultra high molecular weight component, modifies the rheology of the polymer relative to a bimodal polymer. The polymers of various examples therefore have improved rheology leading to better processability without any detrimental effects on other polymer properties.

The shear thinning index (SHI) of the polymers is also important. The SHI is the ratio of the complex viscosity ($\eta^*$) at two different shear stresses and is a measure of the broadness (or narrowness) of the molecular weight distribution. According to the present examples the ethylene polymer has a shear thinning index $SHI_{5,300}$, i.e. a ratio of the complex viscosity at 190° C. and a shear stress of 5 kPa ($\eta^*_5$) and the complex viscosity at 190° C. and a shear stress of 300 kPa ($\eta^*_{300}$), of more than 90, preferably more than 100, such as in the range of 100 to 200, more preferably in the range of 100 to 150.

The melting point Tm of the polymers may be in the range 130 to 140° C.

One of the main features of various examples is the presence of a third component formed after the formation of an initial bimodal polyethylene in the final polymerisation step. This component is preferably one possessing an ultra high molecular weight. The Mw of this component may therefore be at least 1.000 kg/mol. It will be appreciated however that measuring the Mw value directly is difficult as the third component is intimately mixed with the first two components of the process.

The presence of this component does however give rise to a high molecular weight tail in the formed polymer. This cannot, however, be observed on the GPC curve. By incorporating this high molecular weight tail via the third component, the polymers of various examples are capable of being processed at high speeds. As we note above, this is achieved without significantly changing the Mw of the polymer.

The polymers of some examples have a low $F_{max}/\lambda_I$ ratio (maximum force from rheotens measurement/first moment of the relaxation spectrum). $F_{max}/\lambda_I$ ratio of less than 60 cN/s, preferably less than 50 cN/s, especially 45 cN/s or less can be achieved. Preferably the $F_{max}/\lambda_I$ ratio is in the range of 20 to 45, as in the range of 30 to 45.

The $\lambda_I$ value of the polymers of certain examples may be >0.5 s.

Thus, the first moment of the relaxation spectrum of the multimodal polymers of some examples is longer than the first moment of the relaxation spectrum of the corresponding bimodal polymer. A first moment of relaxation spectrum of longer than 0.5 s is achievable.

Fmax is essentially a measure of melt strength. The melt strengths observed in the present case are evidence therefore of good processability. Fmax values of at least 20 cN are possible. Most importantly, however it is the ratio of Fmax to the first moment of the relaxation spectrum which is important. The present inventors have achieved good balance between melt strengths in terms of Fmax and the first moment of the relaxation spectrum $\lambda_I$.

A high Fmax represents the presence of a high molecular weight tail, leading to improved processability. However, Fmax is preferably kept below a certain limit to provide enough melt viscosity. Melt viscosity is essential during stretching but too much viscosity hinders stretching.

By keeping the value of $F_{max}/\lambda_I$ in the given range we achieve a balance between ease of processing and stability. An optimal balance of ease of processing and bubble stability is achieved if $F_{max}/\lambda_I$ is low, preferably 20 to 45.

The ethylene copolymer of certain examples can be formed in three separate polymerisation steps and it therefore comprises at least three components. Preferably, these are formed all together in a multistage process.

The polymer of the disclosure is multimodal. The term "multimodal" means herein, unless otherwise stated, multimodality with respect to molecular weight distribution. Usually, a polyethylene composition, comprising at least two polyethylene fractions, which have been produced under different polymerization conditions resulting in different (weight average) molecular weights and molecular weight distributions for the fractions, is referred to as "multimodal". The prefix "multi" relates to the number of distinguishable polymer fractions present in the polymer. The prefix "multi" can be used herein to refer to two or three or more than three distinguishable components in the polymer. The form of the molecular weight distribution curve, i.e. the appearance of the graph of the polymer weight fraction as a function of its molecular weight, of a multimodal polymer will often show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

As the ethylene copolymer of certain examples comprises at least three components, ideally, the polymer of preferred examples is trimodal.

It will be appreciated that measuring the individual properties of the components of the blend may be difficult, in particular if the blend is made in a multistage process. Where a component, e.g. the higher molecular weight component, is made as a second step in a multistage polymerisation, for example, it is not possible to measure its properties directly. However, the density, $MFR_2$ etc of the component, e.g. HMW component, made in the subsequent step can be calculated using Kim McAuley's equations. Thus, both density and MFR, can be found using K. K. McAuley and J. F. McGregor: On-line Inference of Polymer Properties in an Industrial Polyethylene Reactor, AIChE Journal, June 1991, Vol. 37, No, 6, pages 825-835. The density is calculated from McAuley's equation 37, where final density and density after the first reactor is known. $MFR_2$ is calculated from McAuley's equation 25, where final $MFR_2$ and $MFR_2$ after the first reactor is known. These principles can also be applied to the third component and so on.

If however, a component is individually blended into the polymer, its properties can of course be determined.

The multimodal polymer usable in the present examples comprises a first component, typically a lower weight average molecular weight (LMW) component, and a second component, typically of higher weight average molecular weight (HMW) component (than the first component). The polymer also comprises at least a third component which is preferably an ultra high molecular weight component.

Preferably, at least one of said first and second components is a copolymer of ethylene with at least one comonomer. It is preferred that at least said second component is an ethylene copolymer. Alternatively, if one of said components is a homopolymer, then said first component is preferably the homopolymer. The ultra high molecular weight component is preferably an ethylene copolymer.

Said first component of the multimodal ethylene copolymer preferably has a $MFR_2$ of at least 100 g/10 min, preferably below 500 g/10 min. The molecular weight of the first component should preferably range from 20,000 to 70,000, e.g. 25,000 to 50,000.

The density of the first component of said multimodal ethylene copolymer may range from 940 to 980 kg/m$^3$, e.g. 950 to 970 kg/m$^3$.

The first component of said multimodal ethylene copolymer may form from 30 to 60 wt %, e.g. 45 to 55% by weight of the multimodal polymer.

The second component may form 30 to 60 wt %, e.g. 30 to 55%, as 35 to 45% by weight of the multimodal ethylene copolymer. In one embodiment said second component forms 50 wt % or more of the multimodal ethylene copolymer as defined above or below.

The second component of said multimodal ethylene copolymer preferably has a lower MFR$_2$ than the first component. The second component of said multimodal ethylene copolymer preferably has a lower MFR$_5$ or MFR$_{21}$ than the first component. The density of the second component of said multimodal ethylene copolymer may range from 930 to 970 kg/m$^3$, e.g. 935 to 960 kg/m$^3$. The M$_w$ difference between the first and second components should be at least 50 kg/mol. The Mw of the second component may range from 80,000 to 500,000, preferably 100,000 to 300,000.

The MFR$_5$ of the combination of the first and second components may be 0.1 to 10 g/10 min, such as 0.2 to 8 g/10 min.

The third, preferably ultra high Mw component is a minor component and forms less than 20 wt % of the ethylene copolymer, preferably more than 5 wt %.

This component should not be a prepolymerisation component. Prepolymerisation polymers are formed when a catalyst is prepolymerised before a main polymerisation takes place. In some circumstances the prepolymer formed might contribute a few percent to the overall polymer composition. It is important in the present examples that the prepolymerisation component, should there be one, is not the third component. The third component is preferably formed last in a multistage polymerisation.

The third component can have an Mw of more than 1,000 kg/mol, and/or an MFR$_{21}$ of less than 0.5 g/10 min, preferable less than 0.1 g/10 min, more preferable less than 0.03 g/10 min, such as less than 0.01 g/10 min.

The ethylene copolymer of a preferred example is produced using a multistage process, i.e. each component is made in situ (i.e. in the presence of another). A two stage polymerisation can be used to produce the first two components of the polymer with a third stage optionally being used to provide the ultra high Mw component. It is an alternative but less favoured option for the third component to be blended into the polymer. It is particularly preferred therefore that the first and second components of the examples are made in situ. This may therefore be a bimodal polyethylene. The art contains many disclosures on the manufacture of such bimodal polymers.

Ideally, however, all components are made in a multistage process and various examples of the process provides a third in situ step.

The polymer of certain example can be prepared using any convention polymerisation catalyst such as a single site catalyst or a Ziegler Natta catalyst. Single site catalysts of interest include metallocene catalysts, in particular those based on so called constrained geometry metallocenes or metallocenes involves bis cyclopentadienyl ligands typically with Zr or Hf. These catalysts are well known and further description thereof is unnecessary.

The use of Ziegler Natta catalysts is preferred. These catalysts are well known and typically contain magnesium chloride, an aluminium compound and a titanium compound optionally supported on a particulate support.

Preferred catalysts comprise a transition metal component and an activator. The transition metal component comprises a metal of Group 4 or 5 of the Periodic System (IUPAC) as an active metal. In addition, it may contain other metals or elements, like elements of Groups 2, 13 and 17. Preferably, the transition metal component is a solid. More preferably, it has been supported on a support material, such as inorganic oxide carrier or magnesium halide. Examples of such catalysts are given, among others in WO 95/35323, WO 01/55230, EP 810235 and WO 99/51646. The catalysts disclosed in WO 95/35323 are especially useful as they are well suited in production of both a polyethylene having a high molecular weight and a polyethylene having a low molecular weight. Thus, especially preferably the transition metal component comprises a titanium halide, a magnesium alkoxy alkyl compound and an aluminium alkyl dihalide supported on an inorganic oxide carrier.

In one embodiment a catalyst of Ziegler Natta type, wherein the active components are dispersed and solidified within Mg-based support by the emulsion/solidification method adapted to PE catalyst, e.g. as disclosed in WO03106510 of Borealis, e.g. according to the principles given in the claims thereof.

In another preferable embodiment, the catalyst is a non-silica supported catalyst, i.e. the active components are not supported to an external silica support. Preferably, the support material of the catalyst is a Mg-based support material. Examples of such preferred Ziegler-Natty catalysts are described in EP 0 810 235.

It is preferred if the same catalyst is used in each stage of the manufacture of the ethylene copolymer of various examples. It is thus preferred if the catalyst added in the first stage of the process is transferred to the second polymerisation stage and so on.

Preparation of Polymer

For the preparation of the ethylene polymer of the present examples polymerisation methods well known to the skilled person may be used. The process of some examples primarily relates to the formation of a multimodal polymer by blending each of the components in-situ during the polymerisation process thereof (so called in-situ process). It is envisaged that blending mechanically two or more separately produced components in a manner known in the art could be employed.

The multimodal polyethylene useful in a preferred example is obtained by in-situ blending in a multistage polymerisation process. Accordingly, polymers are obtained by in-situ blending in a multistage, i.e. three or more stage, polymerization process including solution, slurry and gas phase process, in any order. Whilst it is possible to use different catalysts in each stage of the process, it is preferred if the catalyst employed is the same in all stages.

Ideally therefore, the polyethylene polymer of some examples is produced in at least three-stage polymerization using the same catalyst. Thus, for example three slurry reactors or three gas phase reactors, or any combinations thereof, in any order can be employed. Preferably however, the polyethylene is made using a slurry polymerization in a loop reactor followed by two gas phase polymerizations in a gas phase reactor. Thus, the first component is preferably formed in a loop reactor and the second and third components formed in a gas phase reactor.

A loop reactor—gas phase reactor system is well known as Borealis technology, i.e. as a BORSTAR™ reactor system. Such a multistage process is disclosed e.g. in EP-A-0517868.

The conditions used in such a process are well known. For slurry reactors, the reaction temperature will generally be in the range 60 to 110° C., e.g. 85-110° C., the reactor pressure will generally be in the range 5 to 80 bar, e.g. 50-65 bar, and the residence time will generally be in the range 0.3 to 5 hours, e.g. 0.5 to 2 hours. The diluent used will generally be an aliphatic hydrocarbon having a boiling point in the range −70 to +100° C., e.g. propane. In such reactors, polymerization may if desired be effected under supercritical conditions. Slurry polymerisation may also be carried out in bulk where the reaction medium is formed from the monomer being polymerised.

For gas phase reactors, the reaction temperature used will generally be in the range 60 to 115° C., e.g. 70 to 110° C., the reactor pressure will generally be in the range 10 to 25 bar, and the residence time will generally be 1 to 8 hours. The gas used will commonly be a non-reactive gas such as nitrogen or low boiling point hydrocarbons such as propane together with monomer, e.g. ethylene.

A chain-transfer agent, preferably hydrogen, can be added as required to the reactors. It is preferred if the amount of hydrogen used in the manufacture of the first component is very low. Preferably therefore, the amount is less than 1, preferably less than 0.5, e.g. 0.05 to 0.5 mol of $H_2$/kmoles of ethylene are added to the first, e.g. loop reactor.

The amount of hydrogen added to the second reactor, typically gas phase reactor is also low. Values may range from 0.01 to 1, e.g. 0.05 to 0.5 moles of $H_2$/kmoles of ethylene.

Preferably, the first polymer fraction is produced in a continuously operating loop reactor where ethylene is polymerised in the presence of a polymerization catalyst as stated above and a chain transfer agent such as hydrogen. The diluent is typically an inert aliphatic hydrocarbon, preferably isobutane or propane. The reaction product is then transferred, preferably to a continuously operating gas phase reactor. The second component can then be formed in a gas phase reactor using preferably the same catalyst.

The third component can also be formed in the gas phase, preferably in the absence of any hydrogen. Typically, the same conditions of temperature and pressure can be used in reactors two and three of the process. The amount of comonomer added varies however. There is preferably much less comonomer added during the third step of the process, e.g. less than half that employed in the second step. In particular, the ratio of comonomer to ethylene might be 5 to 20 mol/kmol in step three of the process. In step two, higher amounts of comonomer may be employed, such as 20 to 40 mol/kmol ethylene.

A prepolymerisation step may precede the actual polymerisation process.

The ethylene partial pressure in the loop reactor is preferably between 10 and 15 mol %. In the gas phase, it is preferably above 50 mol %.

The ethylene copolymer of various examples can be blended with any other polymer of interest or used on its own as the only olefinic material in an article such as a film or fibre. Thus, the ethylene copolymer of certain examples can be blended with known HDPE, MDPE, LDPE, LLDPE polymers or a mixture of ethylene polymers of certain examples of this disclosure could be used. Preferably the ethylene polymer comprises at least 50% by weight of any polymer composition containing the ethylene polymer, preferably from 80 to 100% by weight and more preferably from 85 to 100% by weight, based on the total weight of the composition. Ideally however any article made from the ethylene polymer of the disclosure consists essentially of the polymer, i.e. contains the ethylene polymer along with standard polymer additives only.

Any blending may be conveniently effected in an extruder. Blends can be compounded and extruded to pellets by any extruder known in the art. It is preferred, however, to use a twin screw extruder. It may be of a co-rotating type, such as those produced by Werner & Pfleiderer having a designation ZSK. Alternatively, it may be of a counter-rotating type, such as those produced by Japan Steel Works, having a designation JSW CIM-P, e.g. CIM90P or LCM continuous mixer by Kobe Steel, such as LCM500H, or Farrel continuous mixer (FCM) by Farrel. It is especially preferred to use a counter-rotating twin screw extruder.

The extruder may contain one or more gear pumps and throttle valves. This equipment can be used to improve the homogeneity of the polymer composition or to increase the capacity of the extruder. Such a solution is disclosed, among others, by T. Fukui and R. Minato: "LCM Continuous Mixer/Gear Pump System for Polyolefin Resins", Society of Plastics Engineers Polyolefins VII International Conference, Feb. 24-27, 1991, Wyndham Greenspoint Hotel, Houston, Tex.

Before the extrusion the polymer may be mixed with the desired additives, fillers and adjuvants as known in the art. Suitable antioxidants and stabilizers are, for instance, sterically hindered phenols, phosphates or phosphonites, sulphur containing antioxidants, alkyl radical scavengers, aromatic amines, hindered amine stabilizers and the blends containing compounds from two or more of the above-mentioned groups.

Examples of sterically hindered phenols are, among others, 2,6-di-tert-butyl-4-methyl phenol (sold, e.g., by Degussa under a trade name of Ionol CP), pentaerythrityl-tetrakis(3-(3',5'-di-tert. butyl-4-hydroxyphenyl)-propionate (sold, e.g., by Ciba Specialty Chemicals under the trade name of Irganox 1010) octadecyl-3-3(3'5'-di-tert-butyl-4'-hydroxyphenyl) propionate (sold, e.g., by Ciba Specialty Chemicals under the trade name of Irganox 1076) and 2,5,7,8-tetramethyl-2(4',8', 12'-trimethyltridecyl)chroman-6-ol (sold, e.g., by BASF under the trade name of Alpha-Tocopherol).

Examples of phosphates and phosphonites are tris(2,4-di-t-butylphenyl)phosphite (sold, e.g., by Ciba Specialty Chemicals under the trade name of Irgafos 168), tetrakis-(2, 4-di-t-butylphenyl)-4,4'-biphenylen-di-phosphonite (sold, e.g., by Ciba Specialty Chemicals under the trade name of Irgafos P-EPQ) and tris-(nonylphenyl)phosphate (sold, e.g., by Dover Chemical under the trade name of Doverphos HiPure 4)

Examples of sulphur-containing antioxidants are dilaurylthiodipropionate (sold, e.g., by Ciba Specialty Chemicals under the trade name of Irganox PS 800), and distearylthiodipropionate (sold, e.g., by Chemtura under the trade name of Lowinox DSTDB).

Examples of nitrogen-containing antioxidants are 4,4'-bis (1,1'-dimethylbenzyl)diphenylamine (sold, e.g., by Chemtura under the trade name of Naugard 445), polymer of 2,2, 4-trimethyl-1,2-dihydroquinoline (sold, e.g., by Chemtura under the trade name of Naugard EL-17), p-(p-toluene-sulfonylamido)-diphenylamine (sold, e.g., by Chemtura under the trade name of Naugard SA) and N,N'-diphenyl-p-phenylene-diamine (sold, e.g., by Chemtura under the trade name of Naugard J).

Commercially available blends of antioxidants and process stabilizers are also available, such as Irganox B225, Irganox B215 and Irganox B561 marketed by Ciba-Specialty chemicals.

Suitable acid scavengers are, for instance, metal stearates, such as calcium stearate and zinc stearate. They are used in amounts generally known in the art, typically from 500 ppm to 10000 ppm and preferably from 500 to 5000 ppm.

Applications

The polymer of the disclosure is preferably used in the manufacture of films, especially blown films or fibres. Such films may be of the order of 20 to 200 μm in thickness, preferably 25 to 100 μm.

The polymer of the certain examples is preferably a significant component of examples of the films of the disclosure, such as at least 50 wt % thereof. The films of certain examples can be monolayer or multilayer. The polymer of various examples may form part of one or more layers of a multilayer film.

The films of certain examples have advantageous properties, in particular in terms of high tensile modulus and tear resistance. Machine direction (MD) tensile modulus values are preferably 700 MPa or more. In the transverse direction (TD) values are 1200 MPa or more.

Tear resistance values can be 300 N/mm or more in the TD. These polymer properties can be measured on films of 40 microns in thickness which consist of example polymers of the disclosure.

The improved rheological properties of the claimed films can be observed in the manufacture of films. The films of the disclosure can have a take off speed of more than 25 m/min, preferably at least 40 m/min, more preferably at least 45 m/min, yet more preferably at least 50 m/min.

The disclosure will now be described with reference to the following non limiting examples and figures.

ANALYTICAL TESTS

Melt Flow Rate

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance $MFR_2$ is measured under 2.16 kg load (condition D), $MFR_5$ is measured under 5 kg load (condition T) or $MFR_{21}$ is measured under 21.6 kg load (condition G).

The quantity FRR (flow rate ratio) is an indication of molecular weight distribution and denotes the ratio of flow rates at different loads. Thus, $FRR_{21/2}$ denotes the value of $MFR_{21}/MFR_2$.

Density

Density of the polymer was measured according to ISO 1183/1872-2B.

For the purpose of this disclosure the density of the blend can be calculated from the densities of the components according to:

$$\rho_b = \sum_i w_i \cdot \rho_i$$

where
$\rho_b$ is the density of the blend,
$w_i$ is the weight fraction of component "i" in the blend and
$\rho_i$ is the density of the component "i".

Molecular Weight $M_w$, $M_n$ and MWD are measured by Gel Permeation Chromatography (GPC) according to the following method:

The weight average molecular weight $M_w$ and the molecular weight distribution (MWD=$M_w/M_n$ wherein $M_n$ is the number average molecular weight and $M_w$, is the weight average molecular weight) is measured according to ISO 16014-4:2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

As it is known in the art, the weight average molecular weight of a blend can be calculated if the molecular weights of its components are known according to:

$$Mw_b = \sum_i w_i \cdot Mw_i$$

where
$Mw_b$ is the weight average molecular weight of the blend,
$w_i$ is the weight fraction of component "i" in the blend and
$Mw_i$ is the weight average molecular weight of the component "i".

The number average molecular weight can be calculated using the well-known mixing rule:

$$\frac{1}{Mn_b} = \sum_i \frac{w_i}{Mn_i}$$

where
$Mn_b$ is the weight average molecular weight of the blend,
$w_i$ is the weight fraction of component "i" in the blend and
$Mn_i$ is the weight average molecular weight of the component "i".

Rheology

Rheological parameters such as Shear Thinning Index SHI and Viscosity are determined by using a rheometer, preferably a Anton Paar Physica MCR 501 Rheometer on compression moulded samples under nitrogen atmosphere at 190° C. using 25 mm diameter plates and plate and plate geometry with a 1.3 mm gap according to ASTM 1440-95. The oscillatory shear experiments were done within the linear viscosity range of strain at frequencies from 0.05 to 300 rad/s (ISO 6721-1). Five measurement points per decade were made. The method is described in detail in WO 00/22040.

The values of storage modulus (G'), loss modulus (G"), complex modulus (G*) and complex viscosity (η*) were obtained as a function of frequency (ω). $\eta_{100}$ is used as abbreviation for the complex viscosity at the frequency of 100 rad/s.

First Moment of the Relaxation Spectrum-$\lambda_I$

The determination of the discrete relaxation time spectrum from the storage and loss modulus data (G', G" (ω)) was done by the use of IRIS Rheo Hub 2008. The linear viscoelastic data (G', G" (ω)) was obtained by frequency sweep measurements undertaken at 190° C., on a Anton Paar MCR 501 coupled with 25 mm parallel plates, applying a gap of 1.3 mm and a strain within linear viscoelastic regime. The underlying calculation principles used for the determination of the discrete relaxation spectrum are described elsewhere [1].

IRIS RheoHub 2008 expresses the relaxation time spectrum as a sum of N Maxwell modes $$\overset{o}{G}(t) = G_e \cdot \sum_{1}^{N} g_i \cdot e^{-\frac{t}{\lambda_i}}$$

wherein $g_i$ and $\lambda_i$ are material parameters and $G_e$ is the equilibrium modulus.

The choice for the maximum number of modes, N used for determination of the discrete relaxation spectrum, was done by using the option "optimum" from IRIS RheoHub 2008. The equilibrium modulus $G_e$ was set at zero.

The so-called first moment of the relaxation spectrum $\lambda_I$ can be described according to reference [2] as:

$$\lambda_I = \frac{\eta_0}{G_N^0} \quad [s]$$

in which, $\eta_0$ are $G_N^0$ values are taken from the "Rheological Constants" table retrieved by IRIS RheoHub 2008, after calculation of the relaxation spectra, using the procedure described above.

REFERENCES

1. Baumgärtel M, Winter H H, "Determination of the discrete relaxation and retardation time spectra from dynamic mechanical data", Rheol Acta 28:511519 (1989).
2. Structure and Rheology of Molten Polymers, John Dealy & Ronald G. Larson, Hanser 2006, pp 119.

Shear thinning index (SHI), which correlates with MWD and is independent of $M_w$, was calculated according to Heino ("Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995).

SHI value is obtained by calculating the complex viscosities at given values of complex modulus and calculating the ratio of the two viscosities. For example, using the values of complex modulus of 2.7 kPa and 210 kPa, then $\eta^*_{2.7kPa}$ and $\eta^*_{210kPa}$ are obtained at a constant value of complex modulus of 2.7 kPa and 210 kPa, respectively. The shear thinning index $SHI_{2.7/210}$ is then defined as the ratio of the two viscosities $\eta^*_{2.7}$ and $\eta^*_{210}$, i.e. $\eta_{2.7}/\eta_{210}$.

It is not always practical to measure the complex viscosity at a low value of the frequency directly. The value can be extrapolated by conducting the measurements down to the frequency of 0.126 rad/s, drawing the plot of complex viscosity vs. frequency in a logarithmic scale, drawing a best-fitting line through the five points corresponding to the lowest values of frequency and reading the viscosity value from this line.

Rheotens Tests for Fmax (Maximal Force)

The strain hardening behaviour is determined by the method as described in the article "Rheotens-Mastercurves and Drawability of Polymer Melts", M. H. Wagner, Polymer Engineering and Sience, Vol. 36, pages 925 to 935. The content of the document is included by reference. The strain hardening behaviour of polymers is analysed by Rheotens apparatus (product of Göttfert, Siemensstr.2, 74711 Buchen, Germany) in which a melt strand is elongated by drawing down with a defined acceleration. The haul-off force F in dependence of draw-down velocity v is recorded. The test procedure is performed in a standard climatized room with controlled room temperature of 23° C. and 30 bar. The Rheotens apparatus (1) is combined with an extruder/melt pump (3) for continuous feeding of the melt strand (2). The extrusion temperature is 200° C.; a capillary die with a diameter of 2 mm and a length of 6 mm is used. The strength length between the capillary die and the Rheotens wheels is 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand (2) drawn down is 120 mm/sec2. The Rheotens was operated in combination with the PC program EXTENS. This is a real-time data-acquisition program, which displays and stores the measured data of tensile force and drawdown speed.

Comonomer Content (NMR):

The comonomer content was determined by using $^{13}$C-NMR. The $^{13}$C-NMR spectra were recorded on Bruker 400 MHz spectrometer at 130° C. from samples dissolved in 1,2,4-trichlorobenzene/benzene-d6 (90/10 w/w).

Differential Scanning Calorimeter (DSC)

The Melting Temperature ($T_m$) and the Crystallization Temperature ($T_{cr}$) were measured with Mettler TA820 differential scanning calorimeter (DSC) on 3±0.5 mg samples. Both crystallization and melting curves were obtained during 10° C./min cooling and heating scans between −10-200° C. Melting and crystallization temperatures were taken as the peaks of endotherms and exotherms, respectively.

Film Water Vapour Transmission Rate (WVTR):

Method 1 (for Large Values of WVTR):

Water vapour transmission rate was measured by using Permatran—W 100K water vapour permeation analysis system, commercially available from Modern Controls, Inc. (MOCON).

Haze ASTM D1003

Haze as measures for the optical appearance was determined according to ASTM D 1003-92 (haze), on blown film specimen with a thickness of 40 μm.

Gloss ASTM D2457

Gloss was determined on blown film specimens with a thickness of 40 μm according to ISO 2813 (ASTM D2457) at an angle of 20°

Clarity/Transparency

Transparency and clarity were determined according to ASTM D1003-00 on blown films of 40 μm thickness produced on a monolayer blown film line with a melt temperature of 225° C.

Tear Resistance (Determined as Elmendorf Tear (N)).

The tear strength is measured using the ISO 6383/2 method. The force required to propagate tearing across a film specimen is measured using a pendulum device. The pendulum swings under gravity through an arc, tearing the specimen from pre-cut slit. The specimen is fixed on one side by the pendulum and on the other side by a stationary clamp. The tear strength is the force required to tear the specimen.

Tensile Modulus

Tensile modulus (0.05-0.25%) is measured according to ISO 527-3 on film samples prepared as described under the Film Sample preparation and in tables with film thickness as given for each test in below Tables 1 and 2 at a cross head speed of 1 mm/min.

Test speed was changed after a deformation of 0.25%.

Specimen type 2 acc. ISO 527-3: stripes with a width of 15 mm and length: 200 mm Example 1

Complex Preparation 87 kg of toluene was added into the reactor. Then 45.5 kg Bomag A in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

Solid Catalyst Component Preparation:

275 kg silica (ES747JR of Crossfield, having average particle size of 20 microns) activated at 600° C. in nitrogen was charged into a catalyst preparation reactor. Then, 411 kg 20% EADC (2.0 mmol/g silica) diluted in 555 liters pentane was added into the reactor at ambient temperature during one hour. The temperature was then increased to 35° C. while stirring the treated silica for one hour. The silica was dried at 50° C. for 8.5 hours. Then 655 kg of the complex prepared as described above (2 mmol Mg/g silica) was added at 23° C. during ten minutes. 86 kg pentane was added into the reactor at 22 DEG C during ten minutes. The slurry was stirred for 8 hours at 50 DEG C. Finally, 52 kg TiCl$_4$ was added during 0.5 hours at 45° C. The slurry was stirred at 40° C. for five hours. The catalyst was then dried by purging with nitrogen.

Polymerisation Example 1

HDPE film polymers were prepared with the catalyst described above. Trimodal HDPE film lots were produced in a reactor train consisting of prepolymeriser, loop, GPR1 and GPR2, and bimodal reference target was produced without GPR2. The operating conditions are summarised below.

The prepolymerisation was of conventional operation of mud feed system with dry catalyst and provides around 2 wt % of the overall polymer.

The loop reactor provides an ethylene homopolymer with a target MFR$_2$ of 350 to 400 g/10 min. The MFR adjustment is done by adding Hydrogen as known. This component is typically 43 to 53 wt % of the polymer.

GPR1 provides a high HMW copolymer component with C$_4$ as a comonomer. It provides around 35 to 45% of the overall polymer.

GPR2 is the UHMW copolymer (C$_4$ as a comonomer), and is produced in the absence of hydrogen. It provides around 5 to 15 wt % of the polymer.

The process conditions and final polymer properties are summarised in Table 1.

TABLE 1

| | | Lot | | | |
|---|---|---|---|---|---|
| target | | CE1 Bi-modal | E1 Tri-modal | E2 Tri-modal | E3 Tri-modal |
| A1 - PREPOLY | | | | | |
| split | wt-% | 2.7 | 2.3 | 2.3 | 2.5 |
| A2 - LOOP | | | | | |
| split | wt-% | 53.0 | 46.5 | 42.6 | 47.4 |
| A2 MFR2 | g/10 min | 350 | 402 | 359 | 367 |
| A3 - GPR1 | | | | | |
| split | wt-% | 44.3 | 37.5 | 39.2 | 44.5 |
| A3 MFR$_5$ | g/10 min | 0.8 | 0.7 | 4.8 | 4.3 |
| A3 density | kg/m$^3$ | 955.6 | 956.1 | 956.3 | 955.9 |
| B3 - GPR2 | | | | | |
| split | wt-% | | 13.7 | 15.9 | 5.5 |
| FINAL PROPERTIES | pellets | | | | |
| Final MFR5 | g/10 min | 0.7 | 0.1 | 0.8 | 0.7 |
| Final MFR21 | g/10 min | 21.0 | 3.7 | 18.0 | 17.0 |
| FRR21/5 | | 30.4 | 30.8 | 23.7 | 24.3 |
| Final Density | kg/m$^3$ | 957.4 | 954.4 | 955.7 | 954.7 |

Polymer Properties:

The characterisation results of the evaluated lots and a commercial reference grade FS 1560 (=CE2) are summarised in Table 2.

TABLE 2

| | | CE1 bimodal | E1 trimodal | E2 trimodal | E3 trimodal | CE2 bimodal |
|---|---|---|---|---|---|---|
| Density | kg/m$^3$ | 957 | 954 | 956 | 955 | 956 |
| MFR2 | g/10 min | 0.16 | 0.02 | 0.16 | 0.12 | 0.06 |
| MFR5 | g/10 min | 0.69 | 0.12 | 0.76 | 0.7 | 0.3 |
| MFR21 | g/10 min | 21 | 3.7 | 18 | 17 | 6 |
| FRR 21/5 | | 30.4 | 30.8 | 23.7 | 24.3 | 20 |
| FRR 5/2 | | 4.3 | 6.0 | 4.8 | 5.8 | 5.0 |
| FRR 21/2 | | 131 | 185 | 113 | 142 | 100 |
| M$_n$ | kg/mol | 8 | 8 | 9 | 8 | 6 |
| M$_w$ | kg/mol | 141 | 196 | 175 | 174 | 238 |
| MWD | | 17.4 | 25.1 | 18.8 | 21 | 40.4 |
| T$_m$ | ° C. | 132 | 134 | 131.8 | 131.4 | 132.5 |
| Eta (0.05 rad/s) | | 63000 | 235000 | 80000 | 88000 | |
| Eta (300 rad/s) | | 860 | 1380 | 870 | 900 | |
| SHI (5/300) | | 88 | 112 | 112 | 119 | |
| tan-delta (0.05 rad/s) | | 2.36 | 1.37 | 1.38 | 1.36 | |
| tan-delta (300 rad/s) | | 0.46 | 0.34 | 0.53 | 0.52 | |
| F$_{max}$ (rheotens) | cN | 24.6 | 46.2 | 23.3 | 26.6 | |
| λ$_I$ | s | 0.28 | 1.39 | 0.591 | 0.634 | |
| F$_{max}$/λ$_I$ | cN/s | 87.9 | 33.2 | 39.4 | 42.0 | |

Figure 1:
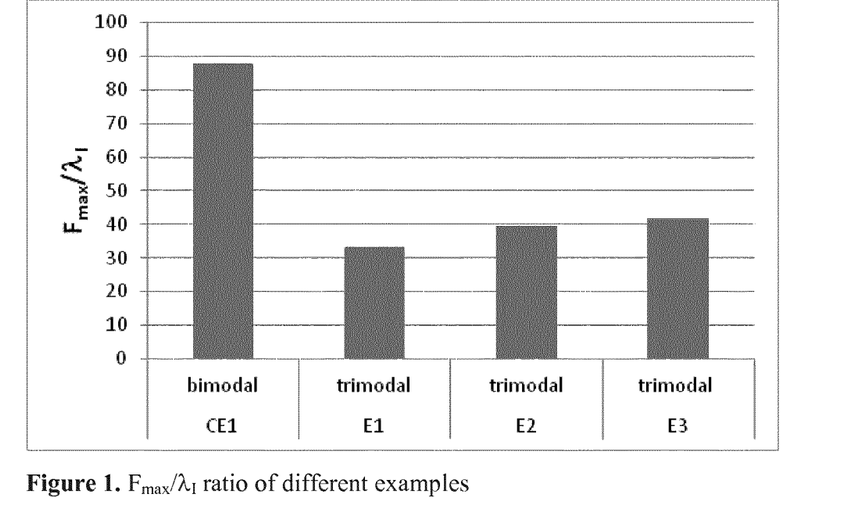
FIG. 1 represents the Fmax/$\lambda_f$ ratio of different examples of the disclosure.
Figure 2:
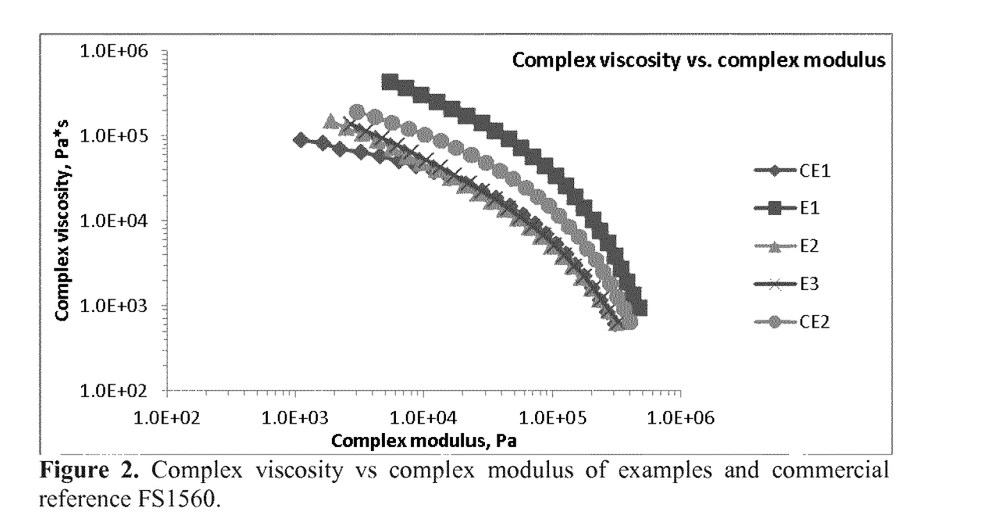
FIG. 2 is a graph of Complex viscosity vs complex modulus of the examples of the disclosure and commercial reference FS1560.

F$_{max}$/λ$_I$ ratio is illustrated in FIG. 1. The relationship between complex viscosity vs complex modulus is shown in FIG. 2. FIG. 1 shows a marked difference between bimodal and trimodal lots in terms of F$_{max}$/λ$_I$ ratio.

Film Processing

Figure 3:
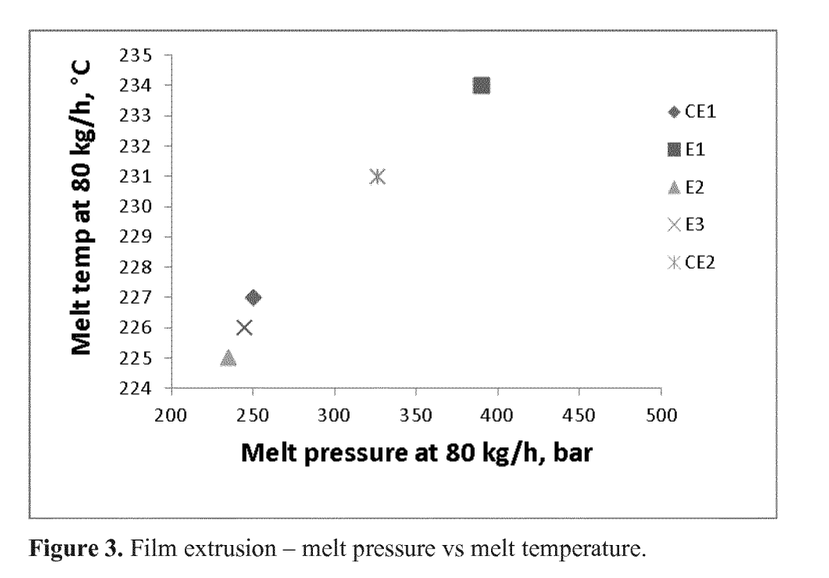
FIG. 3 is a graph of film extrusion—melt pressure vs melt temperature.
Figure 4:
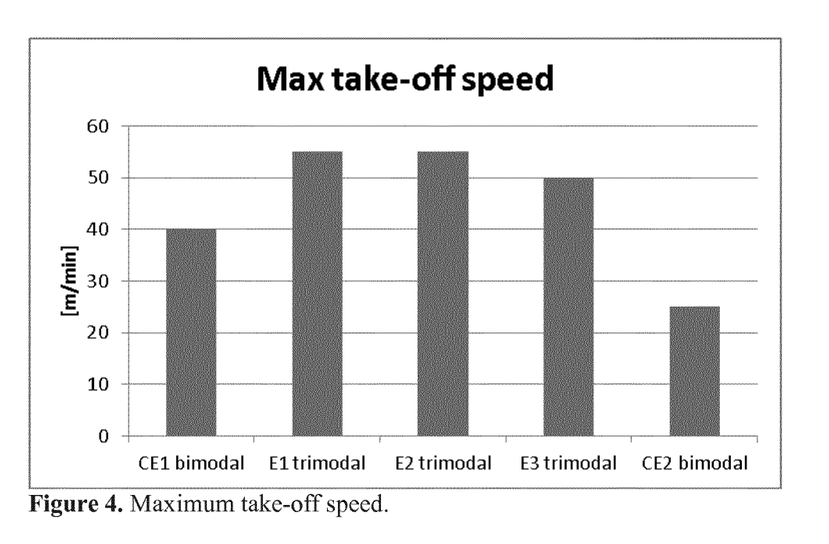
FIG. 4 shows the maximum take-off speed for grades of the disclosure verses the comparative examples.

All resins were blown into film thickness of 40 μm at a BUR of 1:4 in a W&H 70 line. The processability of the evaluated lots is summarised in Table 3. FIG. 3 illustrates the melt temperature and head pressure during the film extrusion and FIG. 4 shows the maximum take-off speed. If CE1 (bimodal) is compared with similar trimodal lots (E2 and E3), a slightly decreased melt temperature and melt pressure was measured for trimodal lots indicating better processability. FIG. 4 shows significant improvement in maximum take-off speed of trimodal lots compared with bimodal references (CE1 and CE2, FS1560). These results confirm the better processability of trimodal lots compared with bimodal counterparts.

TABLE 3

|  |  | CE1 bimodal | E1 trimodal | E2 trimodal | E3 trimodal | CE2 bimodal |
|---|---|---|---|---|---|---|
| Max take-off speed | m/min | 40 | 55 | 55 | 50 | 25 |
| Film thickness at max take off sp. | μm | 18-20 | 20 | 20 | — | 30 |
| Pressure at 80 kg/h | bar | 250 | 390 | 235 | 245 | 326 |
| Temperature at 80 kg/h | ° C. | 227 | 234 | 225 | 226 | 231 |
| Max output | kg/h | 120 | —* | 120 | 120 | 120 |
| Pressure at max output | bar | 294 | — | 278 | 231 | 370 |
| Temperature at max output | ° C. | 225 | — | 226 | 226 | 233 |

*Pressure too high for max output test

Film Properties

The measured film properties are summarised in Table 4. As can be seen similar film properties for bimodal and trimodal lots were measured.

TABLE 4

Film properties.

|  |  | CE1 bi-modal | E2 tri-modal | E3 tri-modal | CE2 bi-modal |
|---|---|---|---|---|---|
| Elmendorf tear resist MD | N/mm | 4.65 | 4.02 | 4.91 | 5.24 |
| Elmendorf tear resist TD | N/mm | 355 | 429 | 397 | 367 |
| Gloss in 20° | % | 1.4 | 1.7 | 2 | 1.5 |
| Gloss out 20° | % | 1.3 | 1.6 | 1.8 | 1.5 |
| Transparency | % | 94.8 | 94.5 | 94.2 | 94.4 |
| Haze | % | 87.5 | 82.2 | 80 | 87.9 |
| Clarity | % | 8.3 | 10.7 | 11.7 | 7.5 |
| WVTR | g/m²/24 h | 1.14 | 1.14 | 1.24 | 1.34 |

This work demonstrates that trimodal polymer design results into low $F_{max}/\lambda_I$ ratio which is consequently reflected as improved film blowing behaviour compared with similar bimodal polymer design. Especially, take-off speed during film blowing was positively affected. The improved processability was achieved without negative effect on the final film properties.

The invention claimed is:

1. A multimodal ethylene copolymer with a density of at least 940 kg/m³ having an $MFR_{21}$ in the range of 1 to 30 g/10 min and a $F_{max}/\lambda_I$ ratio of less than 60 cN/s; said ethylene copolymer comprising at least three components (I) an ethylene and optionally at least one C3-20 alpha olefin comonomer component forming 30 to 60 wt % of said ethylene copolymer;

(II) an ethylene and optionally at least one C3-20 alpha olefin comonomer second component forming 30 to 60 wt % of said ethylene copolymer; and (III) an ethylene and optionally at least one C3-20 alpha olefin comonomer third component forming 3 to 20 wt % of said ethylene copolymer;

wherein at least one of components (II) or (III) is a copolymer.

2. The multimodal ethylene copolymer of claim 1 with a density of at least 940 kg/m³ having an $MFR_{21}$ in the range of 1 to 30 g/10 min and a $F_{max}/\lambda_I$ ratio of less than 60 cN/s; said ethylene copolymer comprising at least three components (I) an ethylene and optionally at least one C3-20 alpha olefin comonomer component forming 30 to 60 wt % of said ethylene copolymer;

(II) an ethylene and optionally at least one C3-20 alpha olefin comonomer second component forming 30 to 60 wt % of said ethylene copolymer; and (III) an ethylene and at least one C3-20 alpha olefin comonomer third component forming 3 to 20 wt % of said ethylene copolymer;

wherein the Mw of component (I) is lower than that of component (II) and wherein the Mw of component (II) is lower than that of component (III).

3. The multimodal ethylene copolymer of claim 1 with a density of at least 940 kg/m³ having an $MFR_{21}$ in the range of 1 to 30 g/10 min and a $F_{max}/\lambda_I$ ratio of less than 60 cN/s; said ethylene copolymer comprising at least three components (I) an ethylene and optionally at least one C3-20 alpha olefin comonomer component forming 30 to 60 wt % of said ethylene copolymer;

(II) an ethylene and optionally at least one C3-20 alpha olefin comonomer second component forming 30 to 60 wt % of said ethylene copolymer; and (III) an ethylene and at least one C3-20 alpha olefin comonomer third component forming 3 to 20 wt % of said ethylene copolymer;

wherein the $MFR_2$ of component (I) is higher than that of component (II) and wherein the $MFR_2$ of component (II) is higher than that of component (III).

4. The multimodal ethylene copolymer of claim 1 with a density of at least 940 kg/m³ having an $MFR_{21}$ in the range of 1 to 30 g/10 min and a $F_{max}/\lambda_I$ ratio of less than 60 cN/s; said ethylene copolymer comprising at least three components (I) an ethylene homopolymer component forming 30 to 60 wt % of said ethylene copolymer;

(II) an ethylene and at least one C3-20 alpha olefin comonomer second component forming 30 to 60 wt % of said ethylene copolymer; and (III) an ethylene and at least one C3-20 alpha olefin comonomer third component forming 3 to 20 wt % of said ethylene copolymer;

wherein the Mw of component (I) is lower than that of component (II) and wherein the Mw of component (II) is lower than that of component (III).

5. The multimodal ethylene copolymer of claim 1 having an $MFR_5$ of 0.6 to 2 g/10 min.

6. The multimodal ethylene copolymer of claim 1 having (I) a homopolymer component, (II) a copolymer component and (III) a copolymer component.

7. The multimodal ethylene copolymer of claim 1 having an Mw/Mn of 10-30.

8. The multimodal ethylene copolymer of claim 1, wherein the components (I) to (III) are blended in situ.

9. The multimodal ethylene copolymer of claim 1 having a density 954 to 965 kg/m$^3$.

10. The multimodal ethylene copolymer of claim 1 prepared using a Ziegler Natta catalyst.

11. The multimodal ethylene copolymer of claim 1 having an $SHI_{5/300}$ of 100 to 150.

12. The multimodal ethylene copolymer of claim 1 having an $F_{max}/\lambda_I$ ratio of less than 50.

13. The multimodal ethylene copolymer of claim 1, wherein component (III) forms less than 10 wt % of the polymer.

14. The multimodal ethylene copolymer as claimed in any of claim 1, wherein the $MFR_5$ of component (I) is higher than that of component (II) and wherein the $MFR_5$ of component (II) is higher than that of component (III); and/or wherein the $MFR_{21}$ of component (I) is higher than that of component (II) and wherein the $MFR_{21}$ of component (II) is higher than that of component (III).

15. A process for the preparation of a multimodal ethylene copolymer comprising:
(I) polymerising ethylene and optionally at least one C3-20 alpha olefin comonomer in a first stage in the presence of a catalyst so as to form a first component forming 30 to 60 wt % of said ethylene copolymer;
(II) polymerising ethylene and optionally at least one C3-20 alpha olefin comonomer in a second stage in the presence of the same catalyst so as to form a second component forming 30 to 60 wt % of said ethylene copolymer; and
(III) polymerising ethylene and optionally at least one C3-20 alpha olefin comonomer in a third stage in the presence of the same catalyst so as to form a third component forming 3 to 20 wt % of said ethylene copolymer;
wherein at least one of components (II) or (III) is a copolymer; and
wherein said multimodal ethylene copolymer has a density of at least 940 kg/m$^3$, an $MFR_{21}$ in the range of 1 to 30 g/10 min and a $F_{max}/\lambda_I$ ratio of less than 60 cN/s.

16. The process of claim 15, wherein component (III) is a copolymer; and wherein the Mw of component (I) is lower than that of component (II); and the Mw of component (II) is lower than that of component (III); or
wherein the $MFR_2$ of component (I) is higher than that of component (II) and wherein the $MFR_2$ of component (II) is higher than that of component (III).

17. The method of claim 15, further comprising manufacturing one or more films, or one or more fibres, from the multimodal ethylene copolymer.

18. A film or fibre comprising the multimodal ethylene copolymer of claim 1.

19. The method of claim 17, wherein one or more blown films are manufactured from the multimodal ethylene copolymer.

* * * * *